(12) United States Patent
Kamalakantha (10) Patent No.: US 8,145,898 B2
(45) Date of Patent: Mar. 27, 2012

(54) ENCRYPTION/DECRYPTION PAY PER USE WEB SERVICE

(75) Inventor: Chandra H. Kamalakantha, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1061 days.

(21) Appl. No.: 10/744,122

(22) Filed: Dec. 23, 2003

(65) Prior Publication Data

US 2005/0138360 A1    Jun. 23, 2005

(51) Int. Cl.
*G06F 21/00* (2006.01)

(52) U.S. Cl. .................................. 713/156; 713/171

(58) Field of Classification Search .............. 713/156, 713/171
See application file for complete search history.

(56) References Cited

U.S. PATENT DOCUMENTS

| | | | |
|---|---|---|---|
| 6,418,421 B1 * | 7/2002 | Hurtado et al. | 705/54 |
| 6,961,858 B2 * | 11/2005 | Fransdonk | 726/29 |
| 7,069,318 B2 * | 6/2006 | Burbeck et al. | 709/224 |
| 2002/0034302 A1 * | 3/2002 | Moriai et al. | 380/270 |
| 2002/0169953 A1 * | 11/2002 | Moharram et al. | 713/151 |
| 2003/0028664 A1 | 2/2003 | Tan | |
| 2003/0123665 A1 * | 7/2003 | Dunstan et al. | 380/255 |
| 2003/0140223 A1 * | 7/2003 | Desideri | 713/153 |
| 2004/0168073 A1 * | 8/2004 | Bourne et al. | 713/193 |
| 2005/0100161 A1 * | 5/2005 | Husemann et al. | 380/200 |

FOREIGN PATENT DOCUMENTS

| | | |
|---|---|---|
| EP | 1077398 A1 | 2/2001 |
| WO | WO-03027924 A | 4/2003 |

OTHER PUBLICATIONS

Atkinson, B., et al: WEb SErvices SEcurity (WS-Security) IBm Developerworks, 'Online' Apr. 5. 2002, URL: ftp://www6.software.ibm.com/software/developer/library/ws-secure.pdf retrieved May 2, 2005.

* cited by examiner

*Primary Examiner* — Nasser Goodarzi
*Assistant Examiner* — Carlton Johnson

(57) ABSTRACT

A method, system, and computer program product for providing security for files transferred across a network, such as the Internet is provided. In one embodiment, a web service receives a request for content from a partner. The web service contacts a certificate authority to authenticate the partner and retrieves the requested content. The web service then generates a secret key and encrypts the content with the secret key to produce encrypted content. The secret key and the encrypted content are then embedded within a digital certificate issued by the certificate authority by using the public key of a public/private key pair issued by the certificate authority. The digital certificate is then transmitted to the partner where the partner decrypts the digital certificate to obtain the secret key and then uses the secret key to decrypt the encrypted content. A similar process may be used for the partner to send content to the web service.

42 Claims, 4 Drawing Sheets

100
Network

100
Network

ENCRYPTION/DECRYPTION PAY PER USE WEB SERVICE

BACKGROUND OF THE INVENTION

1. Technical Field

The present invention relates generally to computer software and, more particularly, to web services.

2. Description of Related Art

The "Internet" is a worldwide network of computers Today, the Internet is made up of more than 65 million computers in more than 100 countries covering commercial, academic and government endeavors. Originally developed for the U.S. military, the Internet became widely used for academic and commercial research. Users had access to unpublished data and journals on a huge variety of subjects. Today, the Internet has become commercialized into a worldwide information highway, providing information on every subject known to humankind.

The Internet's surge in growth in the latter half of the 1990s was twofold. As the major online services (AOL, CompuServe, etc.) connected to the Internet for e-mail exchange, the Internet began to function as a central gateway. A member of one service could finally send mail to a member of another. The Internet glued the world together for electronic mail, and today, the Internet mail protocol is the world standard.

Secondly, with the advent of graphics-based Web browsers such as Mosaic and Netscape Navigator, and soon after, Microsoft's Internet Explorer, the World Wide Web took off. The Web became easily available to users with PCs and Macs rather than only scientists and hackers at UNIX workstations. Delphi was the first proprietary online service to offer Web access, and all the rest followed. At the same time, new Internet service providers rose out of the woodwork to offer access to individuals and companies. As a result, the Web has grown exponentially providing an information exchange of unprecedented proportion. The Web has also become "the" storehouse for drivers, updates and demos that are downloaded via the browser.

Many services on the Internet involve the transfer of sensitive information that needs to remain private. For example, financial transactions, bank accounts, credit card information, and the like, as well as company or government secret documents, may need to be transferred across the Internet, but should be transferred in such a way as to prevent unauthorized access. Thus, businesses and other enterprises who have a need to expose or exchange sensitive information to their partners are always challenged with the way information is transmitted. As mentioned above, there are various expensive schemes that customers can choose (e.g., Secure ftp, ftp (encrypted files), or use a secure tunnel) to ensure privacy in exposing or exchanging the sensitive information. However, all of these solutions come with an additional cost, moreover these solutions rely heavily on the same type of product at the partners receiving end. Currently, there are no tools available that run on any operating system that offer an RC2, DES, or Triple DES web service that does encryption/decryption of the posted files, where the posted files may be in any format. Furthermore, secure File Transfer Protocol (FTP) is often slow and most tools either offer Secure Socket Layer (SSL) based or Secure Shell (SSH) based FTP, but not a combination of both, thus allowing the files that in transit to be susceptible to hacks. Encryption/Decryption of files prior to transfer involves procurement of expensive encryption/decryption infrastructure both for the sender and receiver. In addition, there is always the problem of integrating the file encryption process with the certificate authority process. Also, if FTP is used to transfer the files, the user identification (ID) and password in clear view with FTP, and, thus, security is compromised. Therefore, it would be desirable to have a web service that does not require the partners in an exchange of information to have the same type of product on both, that encrypts/decrypts files in any format, and that incorporates encryption/decryption and digital certificates.

SUMMARY OF THE INVENTION

The present invention provides a method, system, and computer program product for providing security for files transferred across a network, such as the Internet. In one embodiment, a web service receives a request for content from a partner. The web service contacts a certificate authority to authenticate the partner and retrieves the requested content. The web service then generates a secret key and encrypts the content with the secret key to produce encrypted content. The secret key and the encrypted content are then embedded within a digital certificate issued by the certificate authority by using the public key of a public/private key pair issued by the certificate authority. The digital certificate is then transmitted to the partner where the partner decrypts the digital certificate to obtain the secret key and then uses the secret key to decrypt the encrypted content. A similar process may be used for the partner to send content to the web service.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
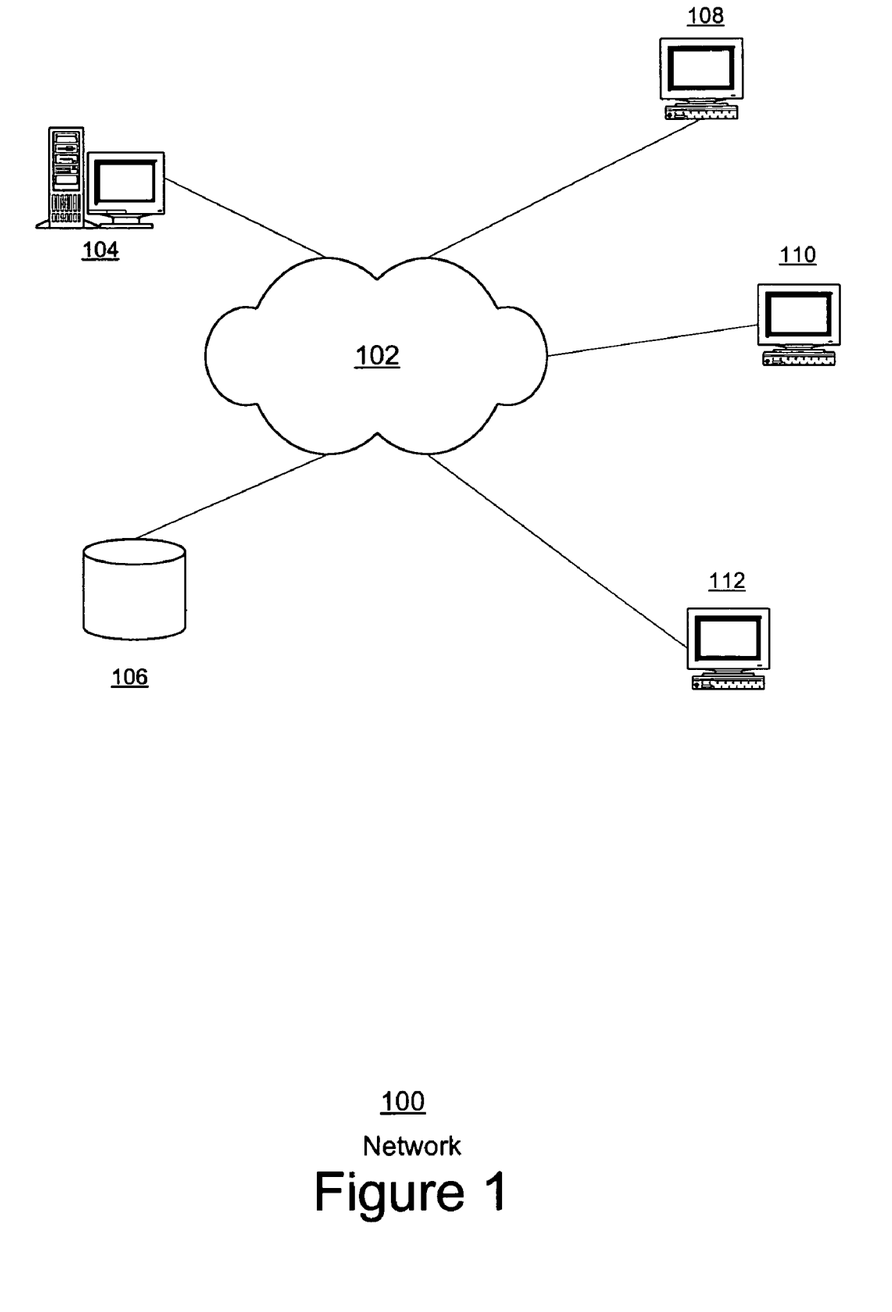
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides a pay per use web service for encryption/decryption of information exchanged between server 104 and any of partner clients 108-112. The pay per use web service is described in more detail below. Distributed data processing system 100 may include additional servers, clients, and other devices not shown. Distributed data processing system 100 also includes printers 114, 116 and 118.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
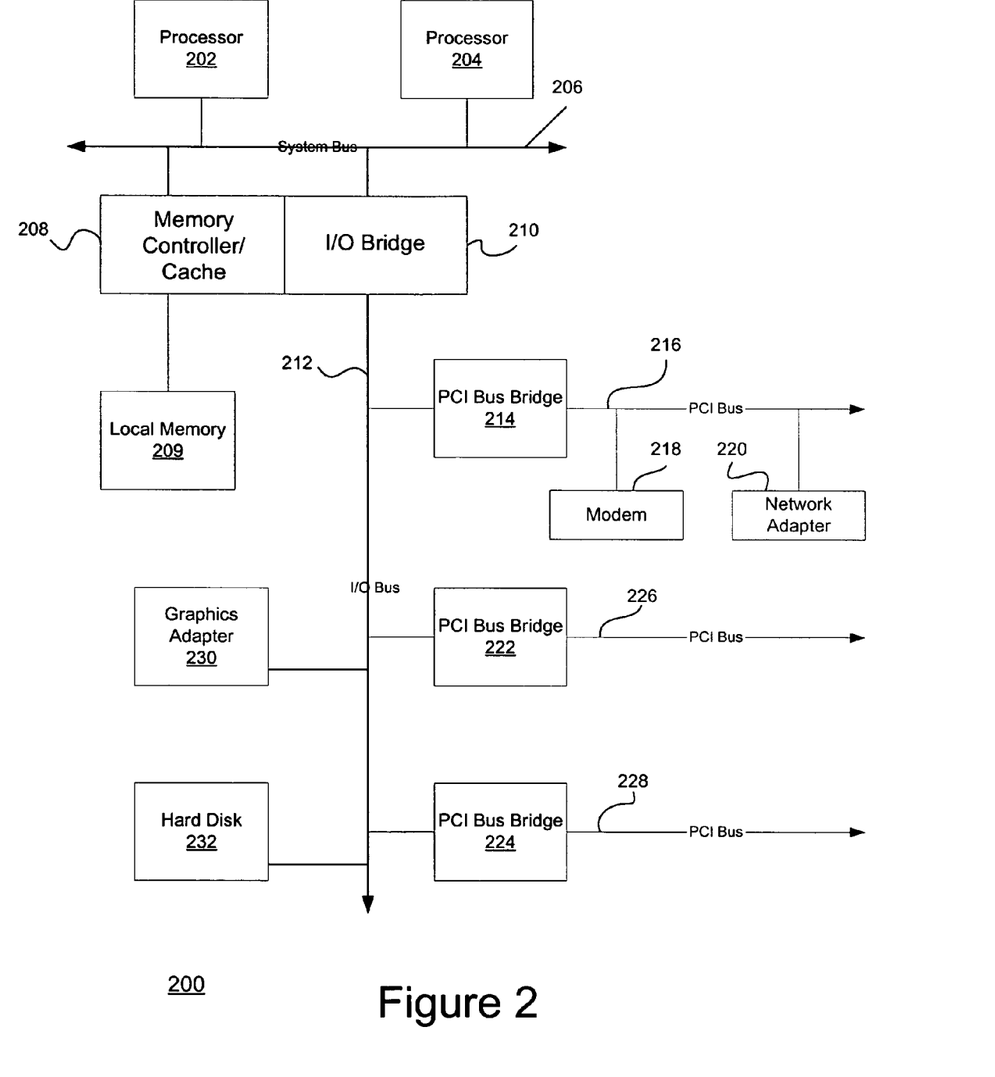
FIG. 2 depicts a block diagram of a data processing system which may be implemented as a server is depicted in accordance with the present invention.

Referring to FIG. 2, a block diagram of a data processing system which may be implemented as a server, such as server 104 in FIG. 1, is depicted in accordance with the present invention. Data processing system 200 may be used to implement the pay per use web service of the present invention as described in greater detail below. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries.

Figure 3:
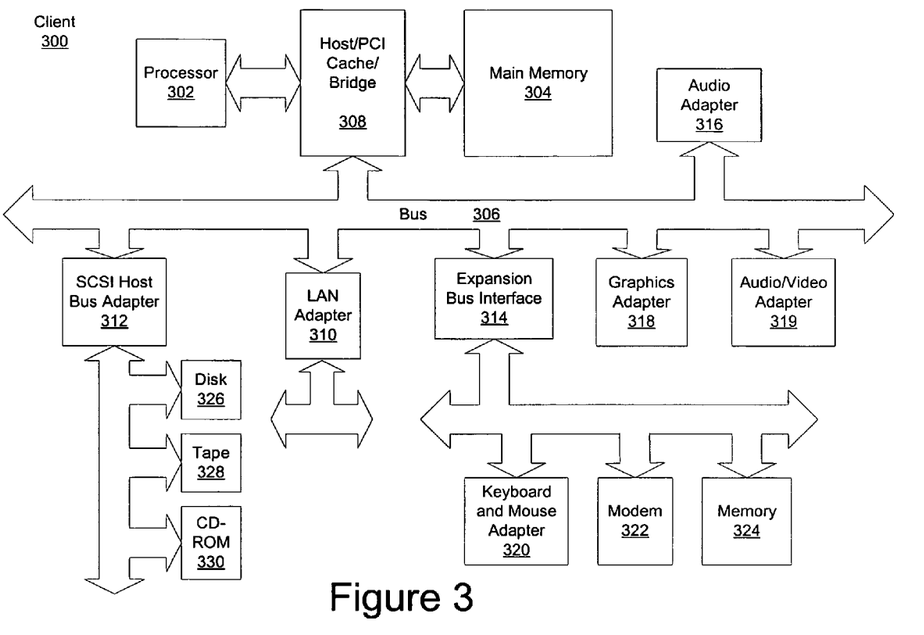
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer that may access the pay per use web service to transfer information with the web service partner. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
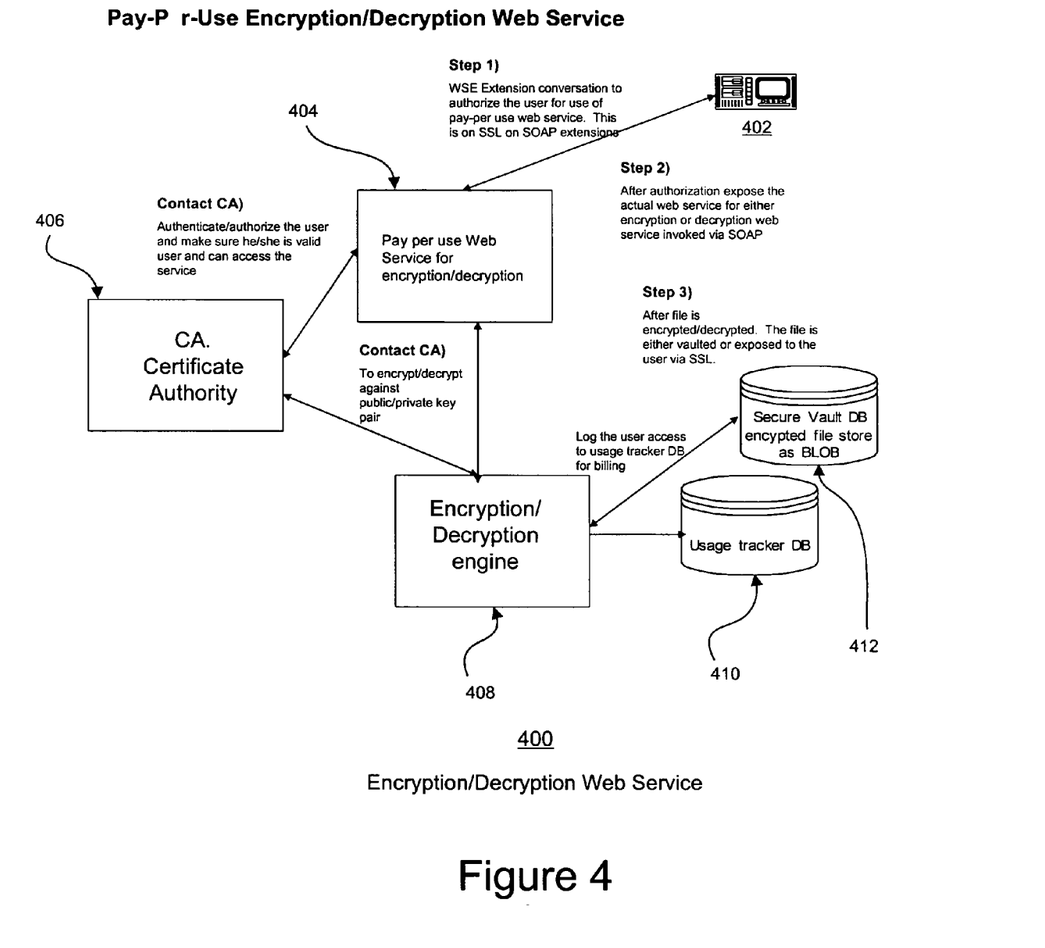
FIG. 4 depicts a schematic diagram illustrating a pay-per-use encryption/decryption web service in accordance with one embodiment of the present invention.

With reference now to FIG. 4, a schematic diagram illustrating a pay-per-use encryption/decryption web service is depicted in accordance with one embodiment of the present invention. The web service 400 may be implemented, for example, on distributed data processing system 100 depicted in FIG. 1. The web service encryption/decryption scheme of the present invention may be provided to an enterprise by, for example, an Information Services provider which then collects a fee from the enterprise, typically based on each use of the service. Hence, a pay-per-use encryption/decryption web service. A partner 402 of the enterprise initiates a conversation with the web service server 404 to authorize the use of the pay-per use web service. Partner 402 may be, for example, a web client, rich client, or an automated script, and may be implemented, for example, on data processing system 300. The conversation with the web service server 404 is, in one embodiment, a Web Service Enhancement (WSE) Extension on a Secure Socket Layer (SSL) with Simple Object Access Protocol (SOAP) extensions.

SSL (Secure Socket Layer) is a handshake protocol that was developed by Netscape Communications Corporation to provide security and privacy over the Internet. The protocol supports server and client authentication. The SSL protocol is application independent, allowing protocols like HTTP, FTP (File Transfer Protocol), and Telnet to be layered on top of it transparently. The SSL protocol is able to negotiate encryption keys as well as authenticate the server before data is exchanged by the higher-level application. The SSL protocol maintains the security and integrity of the transmission channel by using encryption, authentication and message authentication codes.

The SSL Handshake Protocol consists of two phases, server authentication and client authentication, with the second phase being optional. In the first phase, the server, in response to a client's request, sends its certificate and its cipher preferences. The client then generates a master key, which it encrypts with the server's public key, and transmits the encrypted master key to the server. The server recovers the master key and authenticates itself to the client by returning a message encrypted with the master key. Subsequent data is encrypted with keys derived from this master key. In the optional second phase, the server sends a challenge to the client. The client authenticates itself to the server by returning the client's digital signature on the challenge, as well as its public-key certificate.

SOAP is a message-based protocol based on Extensible Markup Language (XML) for accessing services on the Web. It employs XML syntax to send text commands across the Internet using Hypertext Transfer Protocol (HTTP). Similar in purpose to the Distributed Component Object Model (DCOM) and Common Object Request Broker Architecture (CORBA) distributed object systems, but lighter weight and less programming intensive (at least initially), SOAP is expected to become widely used to invoke services throughout the Web. Because of its simple exchange mechanism, SOAP can also be used to implement a messaging system.

The web service server 404 then contacts a Certificate Authority (CA) 406 to authenticate/authorize the user and to ensure that the user is a valid user and may access the web service. The CA 406 may belong to the enterprise implementing the web service or, more typically, is an outside CA utilized by the web service. A CA is an organization that issues digital certificates (digital IDs) and makes its public key widely available to its intended audience. The digital certificate (also called digital ID) is the digital equivalent of an ID card used in conjunction with a public key encryption system. The CA 406 verifies that a public key belongs to a specific company or individual, and the certification process varies depending on the level of certification and the CA itself. Drivers licenses, notarization and fingerprints are types of documentation that may be used.

The digital certificate typically uses the X.509 file format and contains CA 406 and user information, including the user's public key (details below). The CA signs the certificate by creating a digest, or hash, of all the fields in the certificate and encrypting the hash value with its private key. The signature is placed in the certificate.

The process of verifying the "signed certificate" is done by the recipient's (e.g., partner 402) software such as a Web browser or e-mail program. The software uses the widely known public key of the CA to decrypt the signature back into the hash value. If the decryption is successful, the identity of the user is verified. The software then recomputes the hash from the raw data (cleartext) in the certificate and matches it against the decrypted hash. If they match, the integrity of the certificate is verified (it was not tampered with).

A signed certificate (the digital certificate) is typically combined with a signed message, in which case the signature in the certificate verifies the identity of the user while the signature in the message verifies the integrity of the message contents. The fact that the message is encrypted ensures privacy of the content.

An X.509 certificate consists of the following fields:
version
serial number
signature algorithm ID
issuer name
validity period
subject (user) name
subject public key information
issuer unique identifier (version 2 and 3 only)
subject unique identifier (version 2 and 3 only)
extensions (version 3 only)
signature on the above fields This certificate is signed by the issuer to authenticate the binding between the subject (user's) name and the user's public key. Standard extensions include subject and issuer attributes, certification policy information, and key usage restrictions, among others. The X.509 standard is supported by a number of protocols, including Privacy Enhanced Mail (PEM), Secure Hypertext Protocol (SHTTP), and SSL.

An X.509 certificate binds an identity to a pair of electronic keys that can be used for encrypting and signing digital information. The pair consists of two related keys—a public key and a private key. The public key can be used by anyone to verify a message signed with the private key or to encrypt a message that can only be decrypted using the private key. The private key must be kept secure and protected against unauthorized use.

If partner 402 is requesting a file from web service server 404, after partner 402 is authorized by CA 406, the file is retrieved from a database (DB) 412, for example, a secure vault DB, where the file is stored. The file may be stored, for example, as a Binary Large Object (BLOB). A BLOB is a database field that holds any digitized information, including text, images, audio or video. Also known simply as a "large object" or LOB, a BLOB may have a huge storage capacity.

The encryption/decryption engine 408 decrypts the file from the DB 412 then encrypts the file using a different secret key from that used to encrypt the file in the DB 412. The encryption method may be, for example, a Ron's Code (RC) algorithm (also known as a Rivest's Cipher algorithm), Data Encryption Standard (DES), or Triple DES.

RC algorithms are a family of secret key cryptographic algorithms from RSA Security, Inc. of Bedford, Mass. RC2 uses a variable key and the block cipher method. RC4 uses a variable key and stream cipher method. Both RC5 and RC6 are block ciphers with variable keys up to 2,040 bits. RC6 uses integer multiplication for improved performance over R5. RC6 was designed to conform to the Advanced Encryption Standard (AES) standard and was a finalist in the competition for the AES algorithm.

DES is a National Institute of Standards & Technology (NIST)—standard secret key cryptography method that uses a 56-bit key. DES is based on an IBM algorithm which was further developed by the U.S. National Security Agency. It uses the block cipher method which breaks the text into 64-bit blocks before encrypting them. There are several DES encryption modes. The most popular mode exclusive ORs each plaintext block with the previous encrypted block.

DES decryption is very fast and widely used. The secret key may be kept a total secret and used over again. Or, a key can be randomly generated for each session, in which case the new key is transmitted to the recipient using a public key cryptography method such as the Rivest-Shamir-Adleman (RSA) cryptography.

Triple DES increases security by extending the key to 112 or 168 bits, but requires multiple passes and takes more time. EEE3 uses three keys and encrypts three times. EDE3 uses three keys to encrypt, decrypt and encrypt again. EEE2 and EDE2 are similar to EEE3 and EDE3, except that only two keys are used, and the first and third operations use the same key.

Once the file has been encrypted using a secret key by the encryption/decryption engine 408, the encrypted file and key are encrypted using a public key issued by the CA 406 and are sent to the partner 402 as, for example, an X.509 digital certificate. The partner 402 has previously sent the public key to the CA 406 to be used by the encryption/decryption engine in further encrypting the encrypted file and encrypting the secret key with which the file was encrypted. The partner 402 after receiving the digital certificate containing the encrypted file and encrypted secret key, decrypts the secret key using the private key associated with the public key that had been previously sent to the CA 406. Thus, a file may be securely sent from the web service server 404 to a partner 402.

If, rather than requesting a file, the partner 402 desires to send a file to the web service server 404, the encryption/decryption engine creates a secret encryption key and sends the secret key to the partner 402 in a digital certificate issued by CA 406. The partner 402 decrypts the digital certificate to obtain the secret key and then uses the secret key to encrypt the file to be sent to the web service server 404. The encrypted file is then sent in a digital certificate to the web service server 404 where the encryption/decryption engine 408 removes the encrypted file from the digital certificate and decrypts the file using the secret key previously sent to he partner 402. The web service server 404 then saves the file to DB 412. Prior to saving the file to the DB 412, the encryption/decryption engine 408 may re-encrypt the file using the web services encryption methods for securely storing the file. Thus, the partner 402 does not have the encryption key(s) used by the web service, thereby adding an additional security layer preventing the partner 402, as well as others, from accessing other files within the DB 412.

Alternatively, partner 402 may use a secret key it generates itself and to encrypt the file to be sent to the web service server 404 and then encrypt the secret key within a digital certificate containing the secret key and the encrypted file.

As an added layer of security, the encrypted secret key may be transferred between the partner 402 and the web service server 404 as a separate packet from the encrypted file, thereby inhibiting the ability of a hacker to decrypt the file, since even if the hacker decrypts the secret key, the hacker may not have obtained the associated encrypted file.

Once the transaction has been completed, whether the transaction is sending a file to the partner 402 or receiving a file from the partner 402, the transaction is logged in a usage tracker database 410 allowing an information service (IS) provider to bill the enterprise operating the web service for the transactions made using the Information Service (IS) providers software.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a web service for providing security for files transferred across a network, the method comprising:
   receiving a request for content from a partner, the request for content including a partner master key, which is encrypted using a public key of the web service, the partner master key having a corresponding unpublished partner private key;
   recovering the partner master key from the request and contacting a certificate authority (CA) to authenticate the partner master key as belonging to said partner;
   retrieving the content upon authentication that the partner master key belongs to said partner;
   encrypting the content with a web service secret key to produce encrypted content;
   embedding the encrypted content and the web service secret key within a digital certificate issued by the certificate authority;
   encrypting the certificate authority-issued digital certificate, including the embedded encrypted content and web service secret key, with the partner master key; and
   transmitting the encrypted digital certificate to the partner;
   whereby the web-service secret key and encrypted content can be recovered from the encrypted digital certificate using the partner private key and thereafter the encrypted content can be decrypted using the web service secret key.

2. The method as recited in claim 1, wherein embedding the encrypted content and the at least one secret key within a digital certificate comprises encrypting the secret key with a public key.

3. The method as recited in claim 2, wherein the public key is issued by the certificate authority and the corresponding private key has been sent to the partner by the certificate authority.

4. The method as recited in claim 1, wherein a secure socket layer is established between the web service and the partner and the digital certificate is transferred to the partner over the secure socket layer.

5. The method as recited in claim 1, wherein the digital certificate is an X.509 certificate.

6. The method as recited in claim 1, wherein encrypting the content with at least one secret key to produce encrypted content utilizes one of a Ron's Code algorithm, a digital encryption standard algorithm, and a triple digital encryption standard algorithm.

7. The method as recited in claim 1, wherein conversations between the web service and the partner utilize a Web Service Enhancement Extension protocol.

8. The method as recited in claim 1, wherein conversations between the web service and the partner utilize a Simple Object Access Protocol.

9. The method as recited in claim 1, wherein the content comprises one of text, audio, video, pictures, and graphics.

10. A method in a web service for providing security for files transferred across a network, the method comprising:
   receiving a request from a partner to transfer content to a web service, the request to transfer content including a partner master key, which is encrypted using a public key of the web service, there being an unpublished partner private key;
   recovering the partner master key from the request and contacting a certificate authority to authenticate the partner master key;
   receiving a digital certificate comprising an encrypted secret key and encrypted content, wherein the encrypted content has been encrypted with at least one secret key;
   extracting at least one unencrypted secret key from the digital certificate;
   decrypting the encrypted content using the at least one unencrypted secret key to produce decrypted content;
   re-encrypting the decrypted content using a second secret key to produce a re-encrypted content file;
   encrypting the second secret key and the re-encrypted content file with the partner master key to produce a digital certificate; and
   transmitting the digital certificate comprising the encrypted second secret key and the re-encrypted content file to the partner.

11. The method as recited in claim 10, further comprising: storing the unencrypted content in a database.

12. The method as recited in claim 10, further comprising: re-encrypting the unencrypted content to product re-encrypted content; and storing the re-encrypted content in a database.

13. The method as recited in claim 12, wherein the content is stored as a Binary Large Object.

14. The method as recited in claim 10, wherein embedding the encrypted content and the at least one secret key within a digital certificate comprises encrypting the secret key with a public key.

15. The method as recited in claim 14, wherein the public key is issued by the certificate authority and the corresponding private key has been sent to the web service by the certificate authority.

16. The method as recited in claim 10, wherein a secure socket layer is established between the web service and the partner and the digital certificate is transferred over the secure socket layer.

17. The method as recited in claim 10, wherein the digital certificate is an X.509 certificate.

18. The method as recited in claim 10, wherein re-encrypting the content with a second secret key to produce encrypted content utilizes one of a Ron's Code algorithm, a digital encryption standard algorithm, and a triple digital encryption standard algorithm.

19. The method as recited in claim 10, wherein conversations between the web service and the partner utilize a Web Service Enhancement Extension protocol.

20. The method as recited in claim 10, wherein conversations between the web service and the partner utilize a Simple Object Access Protocol.

21. The method as recited in claim 10, wherein the content comprises one of text, audio, video, pictures, and graphics.

22. A non-transitory computer readable storage media containing computer program instructions, which when executed cause a computer to securely transfer files across a network as a web service that provides content files transferred across a network, the computer readable storage media comprising:
   first instructions for receiving a request for content from a partner, the request for content including a partner master key, which is encrypted using a public key of the web service, there being not received from the partner, a partner private key corresponding to the partner master key;
   second instructions for recovering the partner master key from the request and contacting a certificate authority to authenticate the partner master key;
   third instructions for retrieving the content upon authentication that the partner master key belongs to said partner;
   fourth instructions for encrypting the content with a secret key to produce encrypted content;
   fifth instructions for embedding the encrypted content and the secret key within a digital certificate issued by the certificate authority, fifth instructions including instructions to encrypt the digital certificate with the partner master key; and
   sixth instructions for transmitting the encrypted digital certificate to the partner.

23. The computer program product as recited in claim 22, wherein embedding the encrypted content and the at least one secret key within a digital certificate comprises encrypting the secret key with a public key.

24. The computer program product as recited in claim 23, wherein the public key is issued by the certificate authority and the corresponding private key has been sent to the partner by the certificate authority.

25. The computer program product as recited in claim 22, wherein a secure socket layer is established between the web service and the partner and the digital certificate is transferred to the partner over the secure socket layer.

26. The computer program product as recited in claim 22, wherein the digital certificate is an X.509 certificate.

27. The computer program product as recited in claim 22, wherein encrypting the content with at least one secret key to produce encrypted content utilizes one of a Ron's Code algorithm, a digital encryption standard algorithm, and a triple digital encryption standard algorithm.

28. The computer program product as recited in claim 22, wherein conversations between the web service and the partner utilize a Web Service Enhancement Extension protocol.

29. The computer program product as recited in claim 22, wherein conversations between the web service and the partner utilize a Simple Object Access Protocol.

30. The computer program product as recited in claim 22, wherein the content comprises one of text, audio, video, pictures, and graphics.

31. A computer program product on a non-transitory computer readable medium to be executed in a data processing system used as a web service for providing security for files transferred across a network, the computer program product comprising:
   first instructions for receiving a request from a partner to transfer content to a web service the request to transfer content including a partner master key, which is encrypted using a public key of the web service, there being un-received, a partner private key corresponding to the partner master key;

second instructions for recovering the partner master key from the request and contacting a certificate authority to authenticate the partner master key;

third instructions for receiving a first digital certificate comprising an encrypted secret key and encrypted content, wherein the encrypted content has been encrypted with at least one secret key;

fourth instructions for extracting at least one unencrypted secret key from the first digital certificate;

fifth instructions for decrypting the encrypted content using the at least one unencrypted secret key to produce unencrypted content and for re-encrypting the content using a second secret key; and said fifth instructions including additional instructions for encrypting the re-encrypted content and the second secret key into a second digital certificate using the partner master key, and for sending the second digital certificate to said partner whereby the second digital certificate can be decrypted using the partner secret key.

32. The computer program product as recited in claim 31, further comprising: sixth instructions for storing the unencrypted content in a database.

33. The computer program product as recited in claim 31, further comprising: sixth instructions for re-encrypting the unencrypted content to produce re-encrypted content; and seventh instructions for storing the re-encrypted content in a database.

34. The computer program product as recited in claim 33, wherein the content is stored as a Binary Large Object.

35. The computer program product as recited in claim 31, wherein embedding the encrypted content and the at least one secret key within a digital certificate comprises encrypting the secret key with a public key.

36. The computer program product as recited in claim 35, wherein the public key is issued by the certificate authority and the corresponding private key has been sent to the web service by the certificate authority.

37. The computer program product as recited in claim 31, wherein a secure socket layer is established between the web service and the partner and the digital certificate is transferred over the secure socket layer.

38. The computer program product as recited in claim 31, wherein the digital certificate is an X.509 certificate.

39. The computer program product as recited in claim 31, wherein encrypting the content with at least one secret key to produce encrypted content utilizes one of a Ron's Code algorithm, a digital encryption standard algorithm, and a triple digital encryption standard algorithm.

40. The computer program product as recited in claim 31, wherein conversations between the web service and the partner utilize a Web Service Enhancement Extension protocol.

41. The computer program product as recited in claim 31, wherein conversations between the web service and the partner utilize a Simple Object Access Protocol.

42. The computer program product as recited in claim 31, wherein the content comprises one of text, audio, video, pictures, and graphics.

* * * * *